United States Patent
Masaki et al.

(10) Patent No.: US 12,525,906 B2
(45) Date of Patent: Jan. 13, 2026

(54) MOTOR CONTROL METHOD, TRANSFER DEVICE, AND STORING MEDIUM

(71) Applicant: Tokyo Electron Limited, Tokyo (JP)

(72) Inventors: Youichi Masaki, Koshi (JP); Mitsuteru Yano, Koshi (JP); Eiichi Sekimoto, Koshi (JP); Tsuyoshi Otsuka, Koshi (JP); Akihiro Teramoto, Koshi (JP); Teppei Ito, Koshi (JP); Koji Takayanagi, Koshi (JP)

(73) Assignee: Tokyo Electron Limited, Tokyo (JP)

( * ) Notice: Subject to any disclaimer, the term of this patent is extended or adjusted under 35 U.S.C. 154(b) by 146 days.

(21) Appl. No.: 18/480,575

(22) Filed: Oct. 4, 2023

(65) Prior Publication Data

US 2024/0120867 A1    Apr. 11, 2024

(30) Foreign Application Priority Data

Oct. 5, 2022 (JP) ................. 2022-161085

(51) Int. Cl.
*H02P 21/20* (2016.01)
*H02P 21/22* (2016.01)

(52) U.S. Cl.
CPC .............. *H02P 21/20* (2016.02); *H02P 21/22* (2016.02); *H02P 2205/05* (2013.01)

(58) Field of Classification Search
CPC ...... H02P 21/20; H02P 21/22; H02P 2205/05; H02P 29/60; H02P 6/28; H02P 29/032; H01L 21/6715; H01L 21/67742; H01L 21/68707; H01L 21/67178; H01L 21/68; B25J 9/1692; B25J 11/0095; B25J 15/0014; Y10S 388/902
USPC .................................................. 318/432, 558
See application file for complete search history.

(56) References Cited

U.S. PATENT DOCUMENTS

| | | | |
|---|---|---|---|
| 4,641,071 A * | 2/1987 | Tazawa ................ | G05B 19/232 318/561 |
| 11,257,701 B2 * | 2/2022 | Kiyama ............ | H01L 21/67748 |
| 2005/0016818 A1 * | 1/2005 | Ito ....................... | B05B 13/0228 414/936 |

FOREIGN PATENT DOCUMENTS

JP        2013-230036 A    11/2013

* cited by examiner

*Primary Examiner* — David Luo
(74) *Attorney, Agent, or Firm* — Armstrong Teasdale LLP

(57) ABSTRACT

A motor control method for transferring an object to be transferred by a moving object that moves by driving of a motor in a substrate processing apparatus, includes: a data acquisition process of acquiring, at different times, pieces of drive data which relate to the driving of the motor and vary with heat generation of the motor; and a transfer process of transferring the object to be transferred by controlling current to be supplied to the motor, based on each of the pieces of drive data, to compensate for displacement of the object to be transferred from a target transfer position due to the heat generation of the motor.

23 Claims, 9 Drawing Sheets

MOTOR CONTROL METHOD, TRANSFER DEVICE, AND STORING MEDIUM

CROSS-REFERENCE TO RELATED APPLICATION

This application is based upon and claims the benefit of priority from Japanese Patent Application No. 2022-161085, filed on Oct. 5, 2022, the entire contents of which are incorporated herein by reference.

TECHNICAL FIELD

The present disclosure relates to a motor control method, a transfer device, and a non-transitory computer-readable storing medium that stores software.

BACKGROUND

A coating/developing apparatus used to manufacture a semiconductor device is provided with a processing module for processing a semiconductor wafer (referred to hereinafter as a wafer) as a substrate, and a transfer arm as transfer mechanism for transferring the wafer to the processing module. Patent Document 1 discloses a motor control program relating to a positioning operation of the transfer arm.

PRIOR ART DOCUMENT

Patent Document

Patent Document 1: Japanese Laid-Open Patent Publication No. 2013-230036

SUMMARY

According to one embodiment of the present disclosure, there is provided a motor control method for transferring an object to be transferred by a moving object that moves by driving of a motor in a substrate processing apparatus, which includes: a data acquisition process of acquiring, at different times, pieces of drive data which relate to the driving of the motor and vary with heat generation of the motor; and a transfer process of transferring the object to be transferred by controlling current to be supplied to the motor, based on each of the pieces of drive data, to compensate for displacement of the object to be transferred from a target transfer position due to the heat generation of the motor.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Figure 1:
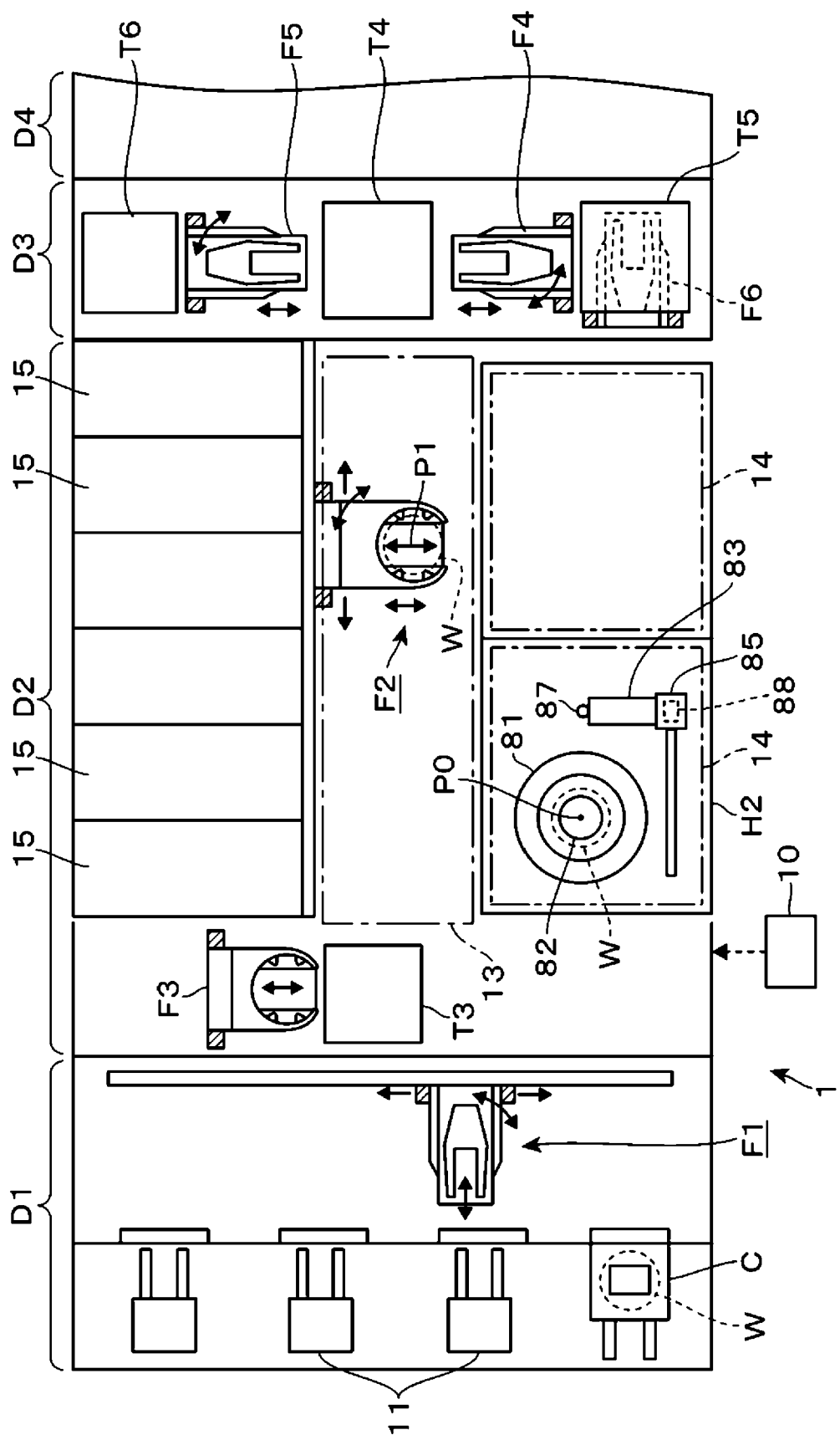
FIG. 1 is a plan view of a coating/developing apparatus of a substrate processing apparatus according to an embodiment of the present disclosure.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

A coating/developing apparatus 1, which is an example of a substrate processing apparatus including a transfer mechanism, according to an embodiment of the present disclosure, will now be described with reference to a plan view of FIG. 1 and a longitudinal sectional front view of FIG. 2. The coating/developing apparatus 1 constitutes a system for performing photolithography on a wafer W, together with an exposure device D4, and is configured such that a carrier block D1, a processing block D2, and an interface block D3 are connected to each other in a row in a transverse direction. In the following description, a direction along the row of these blocks is referred to as a left-right direction. In addition, this left-right direction may be described as a Y direction and is a direction orthogonal to an X direction described later. The exposure device D4 is connected to the interface block D3 on the opposite side of a side to which the processing block D2 is connected. The wafer W is placed on a stage 11 provided in the carrier block D1 in a state in which the wafer W is accommodated in a carrier C, which is a transfer container. The carrier block D1 includes a transfer mechanism F1 for loading and unloading the wafer W to and from the carrier C on the stage 11.

Next, a configuration of the processing block D2 will be described. The processing block D2 is configured by stacking six unit blocks H1 to H6 partitioned from each other in numerical order from the bottom. The transfer and processing of the wafer W are performed in parallel with each other in the unit blocks H1 to H6. The unit blocks H1 to H3 have the same configuration, and the unit blocks H4 to H6 have the same configuration. Among the unit blocks H1 to H6, the unit block H2 illustrated in FIG. 1 will now be described as a representative block. A transfer path 13 of the wafer W, which extends linearly to the left and right, is formed in the center of the front and back of the unit block H2. On the front side of the transfer path 13, two resist film forming modules 14, each of which forms a resist film by supplying (coating) a resist to the wafer W, are provided side by side to the left and right. On the rear side of the transfer path 13, a plurality of heating modules 15 is provided side by side to the left and right. In addition, these heating modules 15 are stacked vertically. Each heating module includes a heat plate on which the wafer W is placed to heat the wafer W after the formation of the resist film. A transfer mechanism F2 for transferring the wafer W in the unit block H2 is provided in the transfer path 13 described above.

A description will now be given focusing on a difference between the unit blocks H4 to H6 and the unit block H2. The unit blocks H4 to H6 include developing modules instead of the resist film forming modules 14. Further, the unit blocks H4 to H6 include heating modules that perform post exposure bake (PEB), which is heat treatment before development after exposure, instead of the heating modules 15 performing heat treatment after forming the resist film. In addition, like the unit block H2, the unit blocks H1, H3 to H6 are provided with the transfer mechanisms F2, respectively.

At a left end portion of the transfer path 13 of each of the unit blocks H1 to H6, a tower T3 extending vertically to span the unit blocks H1 to H6 is provided. The tower T3 is provided with delivery modules TRS and temperature control modules SCPL at a height corresponding to each of the unit blocks H1 to H6. An elevatable transfer mechanism F3 provided in the vicinity of the tower T3 makes it possible to deliver the wafer W between modules of the tower T3.

The delivery modules TRS and the temperature control modules SCPL of the tower T3 are represented as TRS1 to TRS6 and SCPL1 to SCPL6 by adding the same numerals as the corresponding unit blocks H1 to H6. TRS1 to TRS6, and TRS at each place described later are modules for temporarily disposing the wafer W in order to deliver the wafer W between transfer mechanisms. The transfer mechanism F2 of each of the unit blocks H1 to H6 accesses the delivery modules. In addition, the tower T3 is also provided with TRS7 and TRS8 for delivering the wafer W between the transfer mechanism F3 and the transfer mechanism F1 of the carrier block D1. SCPL1 to SCPL6 described above are modules capable of controlling a temperature of the wafer W.

Next, the interface block D3 will be described. The interface block D3 includes towers T4 to T6 extending vertically to span the unit blocks H1 to H6. Further, the interface block D3 is provided with transfer mechanisms F4 to F6 for delivering the wafer W between various modules respectively provided in the towers T4 to T6.

Figure 2:
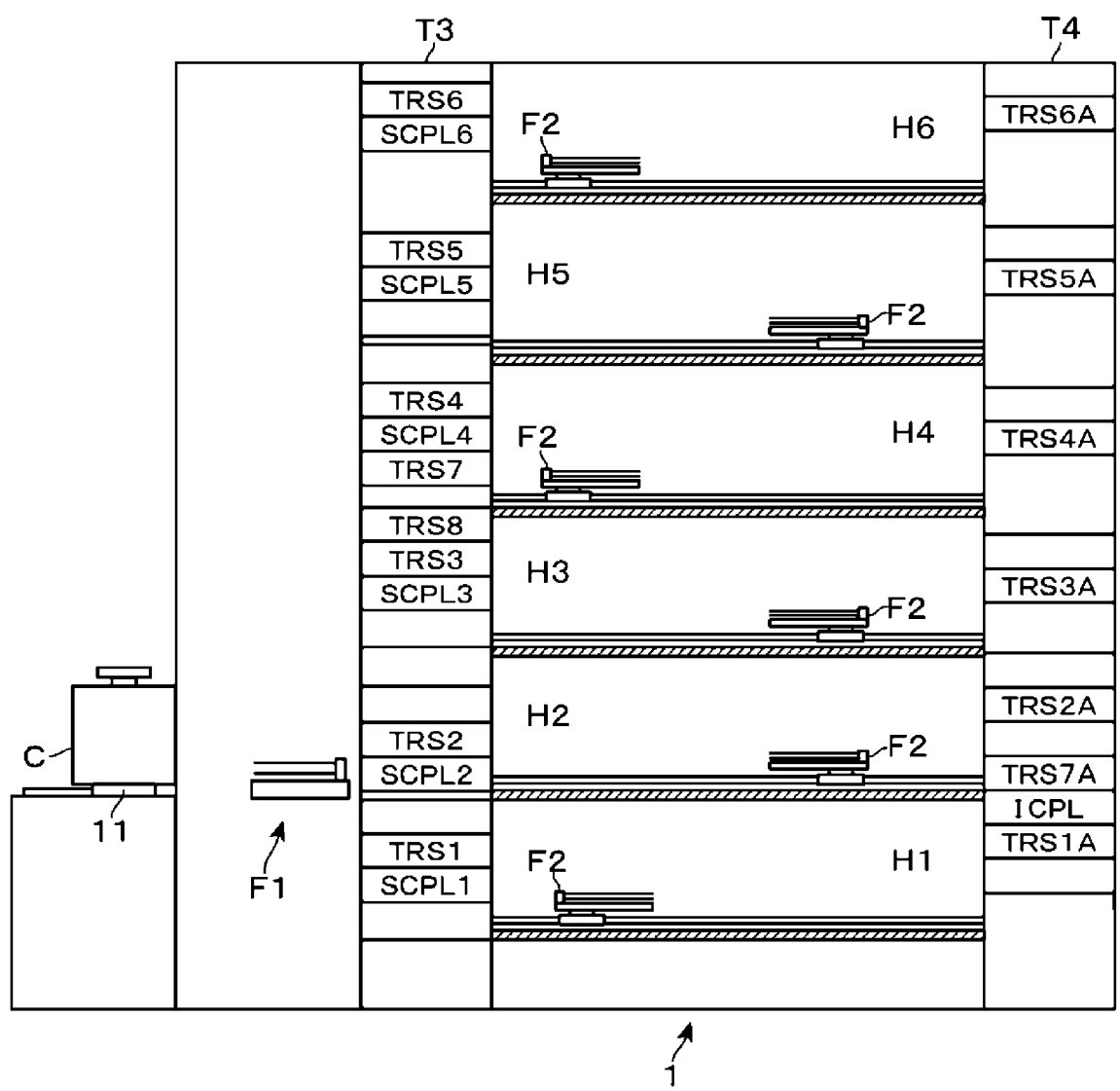
FIG. 2 is a longitudinal sectional front view of the coating/developing apparatus.

As illustrated in FIG. 2, the tower T4 includes delivery modules TRS at the height of the unit blocks H1 to H6. The delivery modules TRS located at the same height as the unit blocks are indicated as TRS1A to TRS6A by adding the same numbers as the corresponding unit blocks and adding English letter A. Further, the tower T4 is provided with ICPL and TRS7A, which are modules for delivering the wafer W between the tower T4 and the exposure device D4. Like SCPL, ICPL adjusts the temperature of the wafer W. A description of the towers T5 and T6 is omitted for the sake of avoiding complexity of description, and a flow of transferring the wafer W in the coating/developing apparatus 1 will be described below.

First, the wafer W discharged from the carrier C by the transfer mechanism F1 is transferred to the delivery module TRS7 of the tower T3 and is distributed to the delivery modules TRS1 to TRS3 of the tower T3 by the transfer mechanism F3. Then, the wafer W is received by each transfer mechanism F2 of the unit blocks H1 to H3 and is transferred in order of the temperature control modules SCPL1 to SCPL3→the resist film forming module 14→the heating module 15. The wafer W, which has been transferred as described above and on which the resist film is formed, is transferred to the delivery modules TRS1A to TRS3A and is transferred in order of the transfer mechanism F4→ICPL→the transfer mechanism F6→the exposure device D4, so that the resist film is exposed.

The wafer W after exposure is transferred in order of the transfer mechanism F6→TRS7A and then is distributed to the delivery modules TRS4A to TRS6A by the transfer mechanism F5. The wafer W transferred to TRS4A to TRS6A in this way is transferred in order of the heating modules→the temperature control modules SCPL4 to SCPL6→the developing modules by the respective transfer mechanisms F2 of unit blocks H4 to H6. Thus, the resist film is developed to form a resist pattern on the wafer W. The wafer W after development is transferred to the delivery modules TRS4 to TRS6 and is transferred in order of the transfer mechanism F3→the delivery module TRS8, so that the wafer W is loaded into the carrier C by transfer mechanism F1.

As described above, the wafer W is sequentially transferred to modules in the coating/developing apparatus 1 by the transfer mechanisms F1 to F6 where the wafer W is subjected to processing. The wafer W, which has been subjected to the processing, returns to the carrier C. In addition, the modules are places configured to be capable of placing the wafer W and include stages, respectively. As a representative of the modules, the resist film forming module 14 will now be described. As illustrated in FIG. 1, the resist film forming module 14 includes a cup 81, a spin chuck 82, which is a stage disposed inside the cup 81, and a supply mechanism 83 for supplying a resist to the wafer W. The spin chuck 82 rotates around a vertical axis while attracting and holding the placed wafer W.

FIG. 1 illustrates a rotational center of the spin chuck 82 in a plan view denoted as a center point P0, and the center of the wafer W in a plan view, supported by the transfer mechanism F2, is denoted as a center point P1. The transfer mechanism F2 moves the wafer W from a rear side of the cup 81 toward an upper side of the spin chuck 82 to transfer the wafer W such that the center point P1 of the wafer W is aligned on the center point P0 of the spin chuck 82 in a plan view. That is, a position at which the center point P1 of the wafer W is aligned on the center point P0 in a plan view is a target transfer position of the wafer W with respect to the spin chuck 82. The wafer W transferred to the target transfer position in this way is placed on the spin chuck 82 and is attracted and held by the spin chuck 82, through a series of operations of raising elevatable pins (not illustrated) provided in the resist film forming module 14, supporting the wafer W by the pins, moving the wafer to a standby position of the substrate supporter 2, and lowering the pins.

The supply mechanism 83 of the resist film forming module 14 includes a mover 85 that moves in the left-right direction (Y direction) by a driving force of a motor 88, and a resist nozzle 87 provided in the mover 85. The resist nozzle 87 is movable between a processing position above the spin chuck 82 and a standby position outside the cup 81 in a plan view, so that a resist is supplied to the center point P1 of the wafer W from the processing position and a resist film is formed by spin coating due to the rotation of the wafer W. When the transfer mechanism F2 receives the wafer W from the resist film forming module 14 after processing, an operation of a reverse procedure to when the wafer W is transferred to the resist film forming module 14 is performed.

Although a description of other modules is omitted, in the same manner as the delivery of the wafer W between the transfer mechanism F2 and the resist film forming module 14, the transfer mechanism transfers the wafer W to a target transfer position set for each module, thereby performing the delivery of the wafer W. Each module includes a stage on which the wafer W is placed. Since some modules are not provided with elevatable pins, the transfer mechanism is raised/lowered instead of the operation of the pins, thereby delivering the wafer W. In addition, as described in the transfer path described above, the transfer mechanisms F1 and F6 deliver the wafer W not only to modules but also to the carrier C and the exposure device D4, in the same manner as the delivery of the wafer W to the modules.

As illustrated in FIG. 1, the coating/developing apparatus 1 includes an upper controller 10, which is a computer. The upper controller 10 includes a software, a storage, and a CPU. The software is stored in a non-transitory computer-readable storing medium such as a compact disc, a hard disk, or a DVD, and is installed in the upper controller 10. In addition, a group of steps is incorporated in the software to execute a series of operations in the coating/developing apparatus 1. Further, the upper controller 10 outputs a control signal to each part of the coating/developing apparatus 1 by the software, so that the transfer operation of the transfer mechanisms F1 to F6 and the processing operation of each module are controlled, as described above, and the transfer of the wafer W and the processing of the wafer W in the above-described transfer path are performed. In addition, any one of the transfer mechanisms F1 to F6, the upper controller 10, and a lower controller 7 and a motor driver 8 described later constitute a transfer device.

Figure 3:
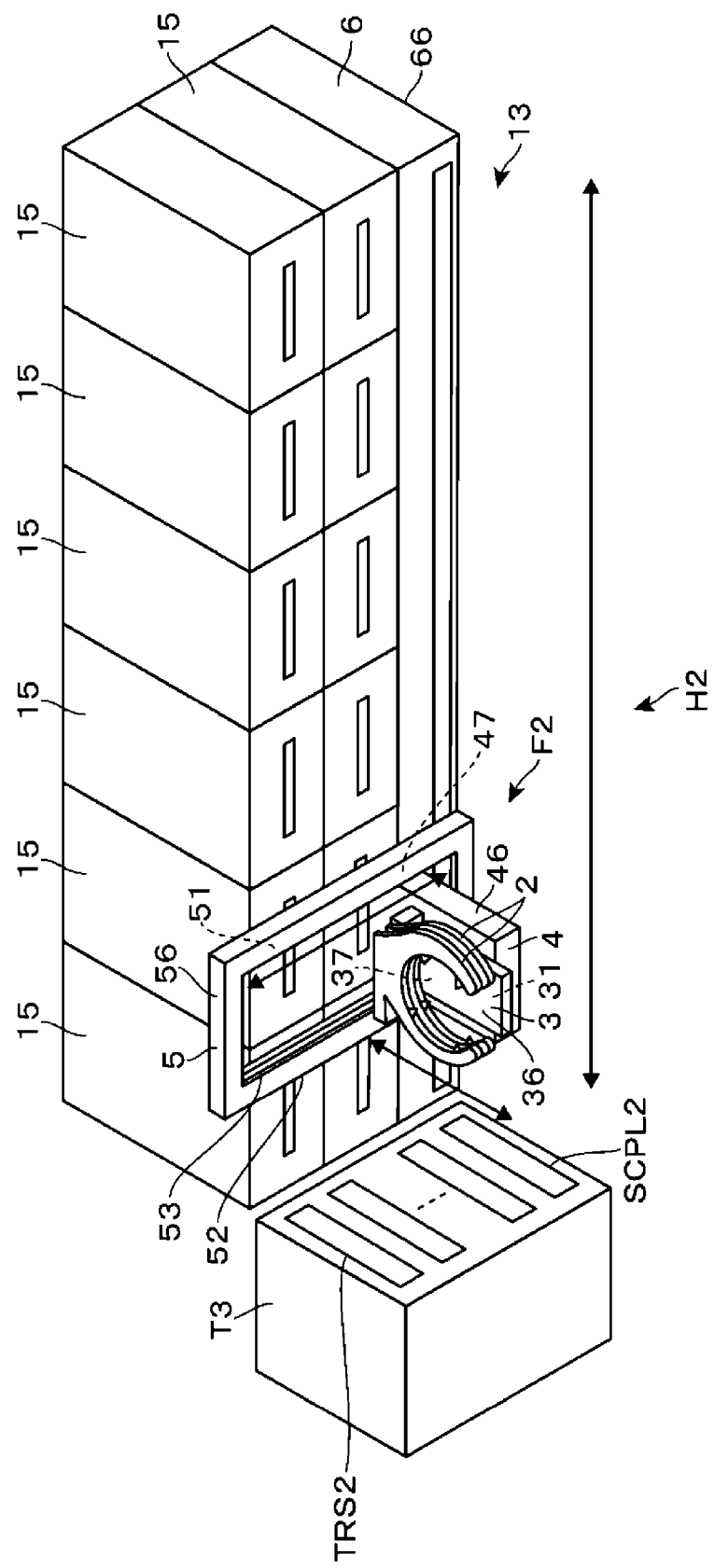
FIG. 3 is a perspective view of a processing block provided in the coating/developing apparatus.
Figure 4:
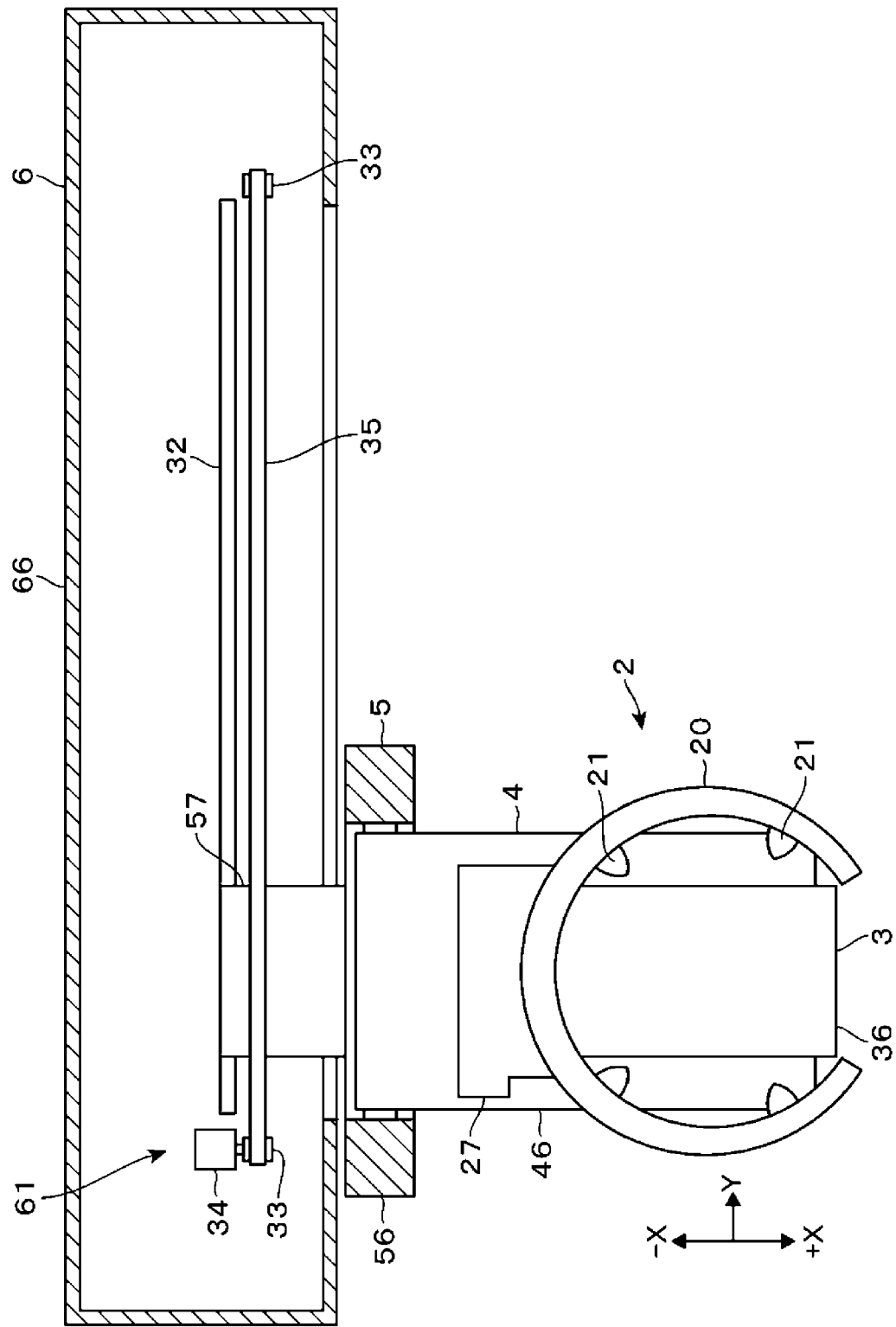
FIG. 4 is a schematic transverse plan view of a transfer mechanism provided in the processing block.
Figure 5:
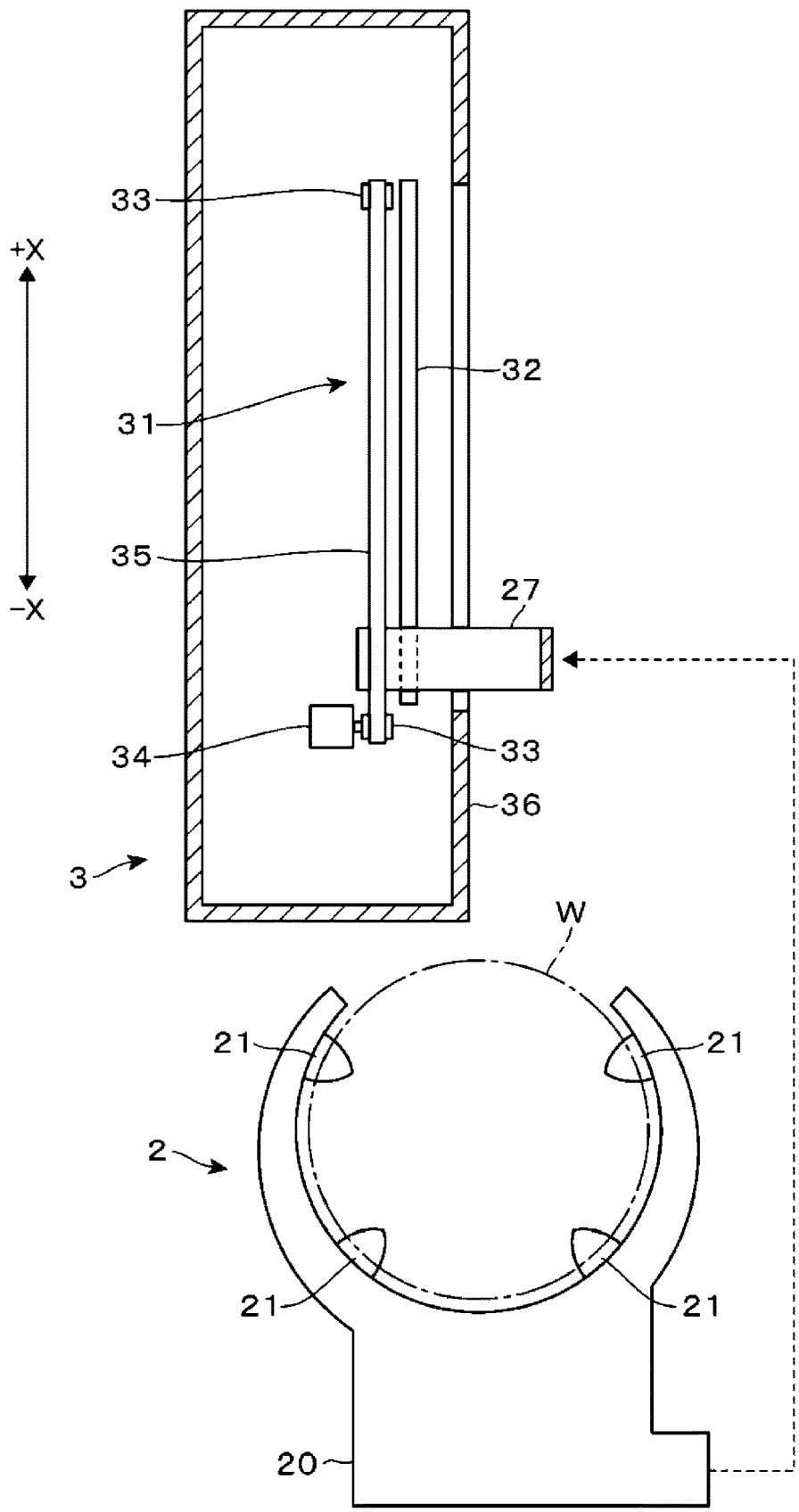
FIG. 5 is a transverse plan view of a base included in the transfer mechanism.

Hereinafter, the transfer mechanism F2 of the processing block D2 as a representative of the transfer mechanisms F1 to F6 will be described with reference to a perspective view of FIG. 3, a schematic transverse plan view of FIG. 4, and a schematic transverse plan view of FIG. 5. The transfer mechanism F2 includes, as a schematic structure, two substrate supporters 2 (moving objects), a base 3, a lifting table 4, a frame 5, and a left-right driving block 6, which are sequentially connected to each other.

The left-right driving block 6 is a left-right elongated block and is provided below the row of the heating modules 15 arranged to the left and right. The frame 5 is configured in an erected vertically-long rectangular frame shape. A lower back of the frame 5 is connected to the left-right driving block 6. The frame 5 linearly moves to the left and right. The lifting table 4 is provided to extend forward from a region surrounded by the frame 5, and a side portion of the rear side of the lifting table 4 is connected to the frame 5. The lifting table 4 linearly moves in a vertical direction. The base 3 having a rectangular shape in a plan view is provided on the lifting table 4 and rotates around the vertical axis.

The substrate supporters 2 are provided above the base 3 to overlap each other. Each of the substrate supporters 2 includes an encloser 20, which is a horizontal plate having a substantially C shape in a plan view, that surrounds the side periphery of the wafer W, and a plurality of protrusions 21 protruding from the encloser 20 to a region surrounded by the encloser 20. A peripheral portion of a lower surface of the wafer W is supported by the protrusions 21. The two substrate supporters 2 move horizontally independently in a straight direction, which is the longitudinal direction of the base 3.

For the transfer of the wafer W to the modules described above, the base 3 is in a state parallel to a module as a delivery target of the wafer W in a plan view. For example, when the resist film forming module 14 is the delivery target, the base 3 is positioned behind the resist film forming module 14 in a plan view. Then, the substrate supporter 2 moves on the base 3 and the wafer W is transferred to the target transfer position as described above.

In some cases, the movement direction of the substrate supporter 2 is referred to as an X direction, and one side and the other side of the X direction are referred to as a +X side and a −X side, respectively. When the base 3 moves, the substrate supporter 2 moves to a standby position overlapping the base 3 (a position illustrated in FIGS. 1 and 3), and when the wafer W is delivered to (transferred to and received from) the module, the substrate supporter 2 moves to a transfer position on the +X side of the standby position. The encloser 20 constituting the substrate supporter 2 described above has a configuration in which a ring is cut such that the encloser 20 is opened on the +X side. A connecter 27 for connecting the substrate supporter 2 to the base 3 is provided on the −X side of the encloser 20.

The base 3, the lifting table 4, the frame 5, and the left-right driving block 6 are configured by housings 36, 46, 56, and 66, respectively. Therefore, the base 3, the lifting table 4, the frame 5, and the left-right driving block 6 have spaces defined therein, respectively. As described above, the substrate supporter 2 is connected to the base 3, the base 3 is connected to the lifting table 4, the lifting table 4 is connected to the frame 5, and the frame 5 is connected to the left-right driving block 6. More specifically, the substrate supporter 2, the base 3, the lifting table 4, and the frame 5 are connected to drive mechanisms provided in spaces inside the housings, respectively.

In the space within the housing 36 of the base 3, linear drive mechanisms 31 and 31 for individually linearly moving the two substrate supporters 2 in the X direction are provided. In the space within the housing 56, a linear drive mechanism 51 for raising and lowering the lifting table 4 is provided. In the space within the housing 66, a linear drive mechanism 61 for linearly moving the frame 5 is provided. In addition, in the space within the housing 46 of the lifting table 4, a rotation drive mechanism for rotating the base 3 is provided. The rotation drive mechanism and the linear drive mechanisms 31, 51, and 61 may be collectively referred to as each drive mechanism. In addition, the linear drive mechanism 51 is not illustrated.

Among the linear drive mechanisms 31, 51, and 61, the linear drive mechanism 31 of the base 3 will now be described with reference to FIG. 5. FIG. 5 illustrates one of the two linear drive mechanisms 31. The linear drive mechanism 31 includes a guide rail 32, a set of pulleys 33, a motor 34, and a drive belt 35. The guide rail 32 extends in a movement direction (i.e., X direction) of the substrate supporter 2 to be moved. The set of pulleys 33 is arranged to be spaced apart from each other in the X direction and is provided so as to rotate about a horizontal axis orthogonal to the X direction.

The motor 34 is, for example, a servomotor, and transmits pieces of torque data, as pieces of drive data relating to driving of the motor 34 and varying with heat generation of the motor 34, to a lower controller 7 described later. In addition, the pieces of drive data relating to the driving of the motor 34 indicates pieces of data that is obtainable by driving the motor 34 and does not mean pieces of detection data of a temperature sensor that detects temperature regardless of operation of the motor 34 by being disposed around the motor 34. The motor 34 is connected to one pulley 33 of the set of pulleys 33 to rotate the corresponding pulley 33.

The drive belt 35 is an endless (i.e., annular) belt stretched between the set of pulleys 33. The connector 27 of the substrate supporter 2 is connected to the guide rail 32 and the drive belt 35 via a slit-like through-hole extending in the X direction on the side surface of the housing 36. The substrate supporter 2 moves in the X direction with the movement of the drive belt 35 due to the rotation of the motor 34.

The linear drive mechanisms 51 and 61 have the same configuration as the linear drive mechanism 31 except that the extension direction of the guide rail 32, the arrangement direction and disposed interval of the two pulleys 33, the orientation of the rotation axis of each pulley 33, the sizes of components of the guide rail 32 or pulleys 33, the rotation direction of the motor 34 and the like are different from those of the linear drive mechanism 31. The housings 56 and 66 in which these linear drive mechanisms 51 and 61 are provided have the same configuration as the housing 36 such that the slit-like through-hole is formed so as to extend in the movement direction of a target to be linearly moved. A connector provided in the target to be linearly moved is connected to the linear drive mechanism in the housing through this through-hole.

A description of the linear drive mechanism 51 for raising and lowering the base 3 is omitted. A description of the linear drive mechanism 61 for moving the base 3 in the left-right direction (Y direction) will now be briefly given. The pulleys 33 are provided to be spaced apart from each other left and right within the housing 66. The rotational axis of the pulleys 33 is disposed to follow the vertical axis, and the drive belt 35 is hung on the pulleys 33. The guide rail 32 extends in the left-right direction. A through-hole is opened in the front surface of the housing 66. A connector 57 provided at the rear portion of the frame 5, which is a target to be linearly moved, is connected to the guide rail 32 and the drive belt 35 via the through-hole. Further, the rotation drive mechanism for rotating the base 3 has the same configuration as the linear drive mechanism except that the guide rail 32 is not provided. The base 3 is connected to the pulley rotating by the motor 34 through the drive belt 35.

The motor driver 8 including various control circuits is connected to the motor 34 of each drive mechanism of the transfer mechanism F2 described above. These motor driver 8 are connected to the lower controller 7. The lower controller 7 is connected to the upper controller 10. The lower controller 7 and the motor driver 8 are not illustrated in FIGS. 1 to 5.

The upper controller 10 outputs a movement command signal to the lower controller 7 such that the wafer W is transferred along the transfer path described above. The lower controller 7 outputs a pulse signal to the motor driver 8 according to the movement command signal. The motor driver 8 is connected to a power supply and performs control such that current corresponding to the number of pulses of the pulse signal is supplied to the motor 34. The motor 34 rotates at a rotation rate corresponding to the supplied current. Specifically, as the number of output pulses increases, the current to be supplied to the motor 34 increases, and the rotation rate of the motor 34 also increases.

Figure 6:
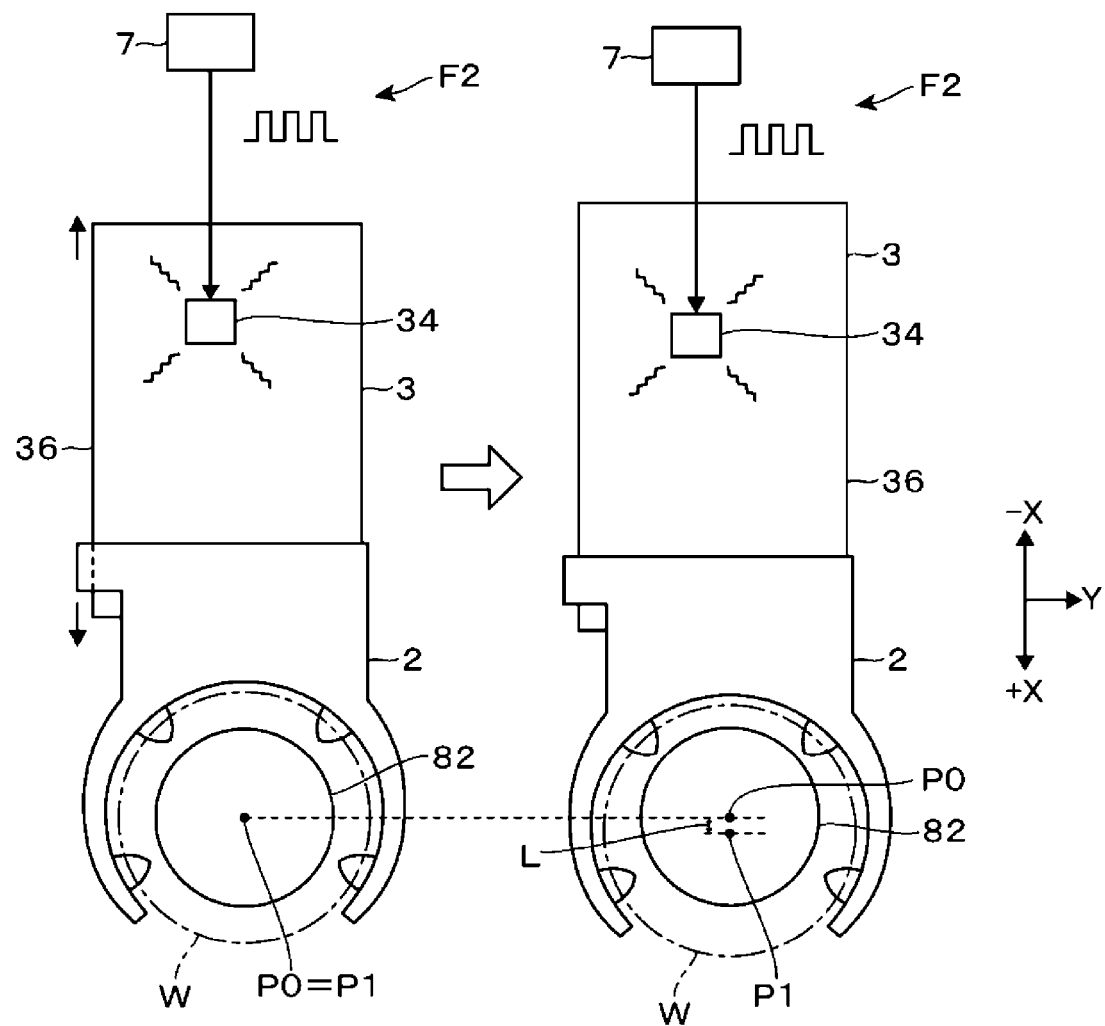
FIG. 6 is an explanatory diagram illustrating an outline of a motor control method in a comparative mode.
Figure 7:
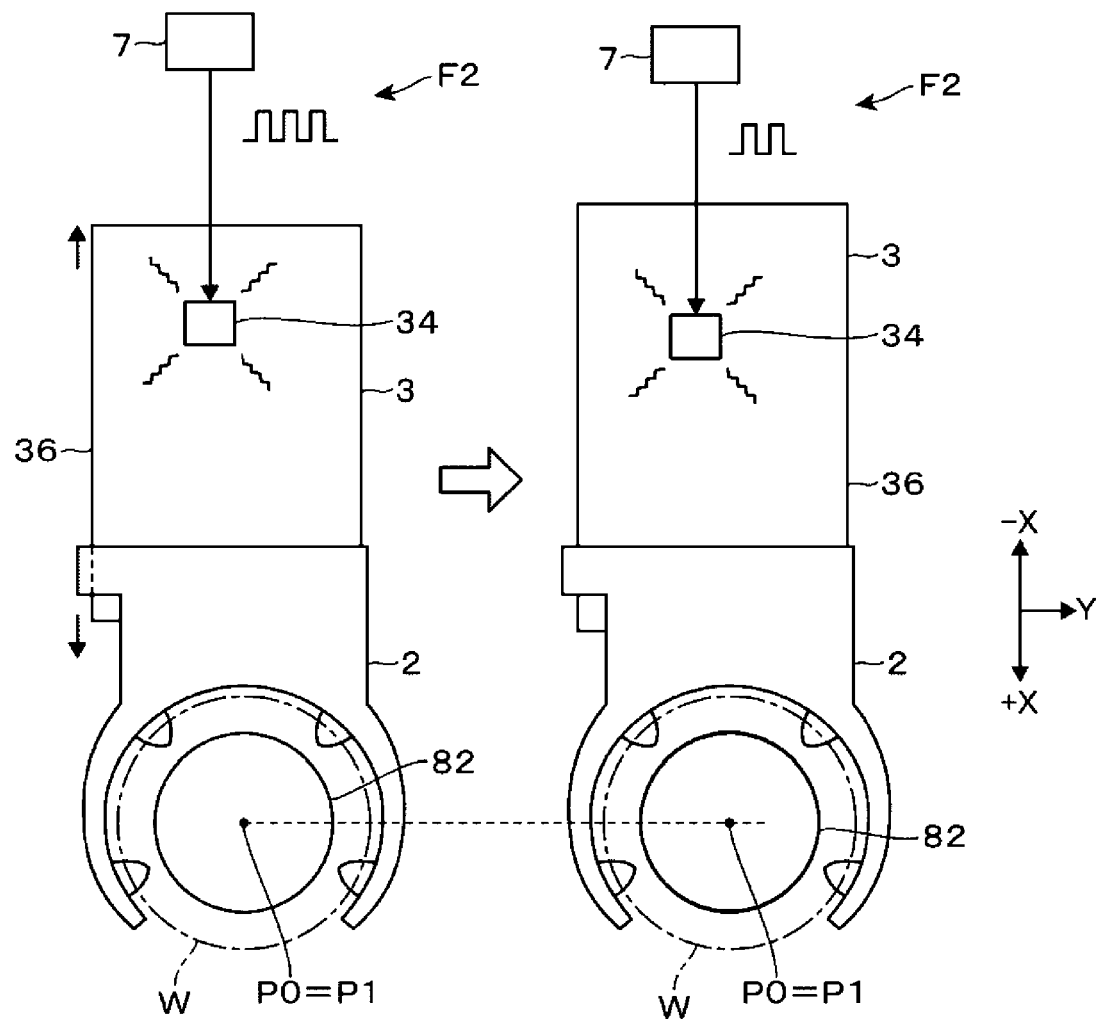
FIG. 7 is an explanatory diagram illustrating an outline of a motor control method according to the present disclosure.

Here, in order to easily explain an operation control method of the transfer mechanism F2 of the present disclosure, an operation of the transfer mechanism F2 of a comparative mode in which a motor control method of the present disclosure is not performed will be described first with reference to FIG. 6. More specifically, a shape of the base 3 including the substrate supporters 2 and the linear drive mechanism 31, when the wafer W is transferred to the spin chuck 82 of the resist film forming module 14, is described. In addition, since FIG. 6, and FIG. 7 illustrated later show the outline of control, the motor driver 8 is not illustrated, and a pulse signal from the lower controller 7 is illustrated as being directly input to the motor 34. Further, the X direction, which is the movement direction of the substrate supporters 2 when the wafer W is transferred to the spin chuck 82, is orthogonal to the Y direction.

In a state in which the substrate supporter 2 is located at a standby position on the base 3, the movement command signal is output from the upper controller 10, and current corresponding to the number of pulses specified by the movement command signal is output to the motor 34 of the linear drive mechanism 31. Then, the substrate supporter 2 moves in the +X direction and is positioned at a transfer position. In a time period shortly after the coating/developing apparatus 1 starts operation, the central point P1 of the wafer W supported by the substrate supporter 2 and the center point P0 of the spin chuck 82 at the transfer position are aligned (left side of FIG. 6), in a plan view, as described above.

However, when the coating/developing apparatus 1 continues to operate and the transfer operation by the linear drive mechanism 31 is repeated, a temperature of the motor 34 rises and heat is stored in the housing 36 constituting the base 3, so that the housing 36 thermally expands. As a result, a distance between the pulleys 33 constituting the linear drive mechanism 31 provided in the housing 36 is widened, the drive belt 35 is extended, and an amount of movement of the substrate supporter 2 per pulse increases. Accordingly, when the substrate supporter 2 moves from the standby position to the transfer position by supplying current corresponding to a preset number of pulses, the transfer position is displaced to the +X side.

Therefore, as illustrated on the right side of FIG. 6, the center point P1 of the wafer W supported by the substrate supporter 2 at the transfer position in a plan view is displaced to the +X side with respect to the center point P0 of the spin chuck 82. While this displacement is maintained, the wafer W may be placed on the spin chuck 82. As a result, the resist is supplied to an eccentric position from the center point P1 of the wafer W. As a result, a film thickness distribution of the resist film in the plane of the wafer W may be abnormal.

The amount of displacement in the X direction between the center points P0 and P1 in a plan view is indicated as L in the figure. The displacement amount L fluctuates according to an amount of extension in a longitudinal direction due to thermal expansion of the housing 36. As heat storage within the housing 36 proceeds, the displacement amount L also increases, and eventually the thermal expansion is saturated so that the increase in the displacement amount also reaches a limit. The displacement amount L when the increase reaches the limit is, for example, about several tens of micrometers (μm). Heat generation of the motor 34 is reduced by pausing the operation of the coating/developing apparatus 1. When heat inside the housing 36 is dissipated, the housing 36 contracts. Therefore, the transfer position of the substrate supporter 2 is shifted to the −X side, and the displacement amount L decreases.

While the transfer of the wafer W to the resist film forming module 14 is exemplified, displacement also occurs even when the wafer W is transferred to another module. Such displacement may cause abnormality in the processing of the wafer W. For example, when position displacement of the wafer W occurs with respect to a heat plate of the heating module 15, a temperature distribution in the plane of the wafer W may fluctuate.

As described above, the displacement occurs between the center points P0 and P1 in the X direction due to the heat generation of the motor 34. As the heat generation of the motor 34 increases, torque output from the motor 34 which is in operation rises. FIG. 7 is an explanatory diagram illustrating an outline of a motor control method according to the present disclosure. Similar to FIG. 6, FIG. 7 illustrates a state in which the substrate supporter 2 is moved to the transfer position in delivering the wafer W to the spin chuck 82. In the motor control method of the present disclosure, the number of pulses for driving the motor 34 is changed based on torque. Specifically, current corresponding to the number of pulses, which is specified by the movement command signal from the upper controller 10, (hereinafter referred to as the specified number of pulses), and the number of pulses, which is calculated from the compensated number of pulses corresponding to the amount of compensation of the specified number of pulses, (hereinafter referred to as the number of command pulses), is supplied to the motor 34 to move the substrate supporter 2 from the standby position to the transfer position. The compensated number of pulses is calculated based on torque. Therefore, the compensated number of pulses and the number of command pulses increase or decrease according to acquired torque.

The left side of FIG. 7 illustrates a state in which the thermal expansion of the housing 36 does not occur, in the same manner as in the left side of FIG. 6, and the right side of FIG. 7 illustrates a state in which the housing 36 thermally expands, in the same manner as in the right side of FIG. 6. As illustrated in FIG. 7, the compensated number of pulses is calculated such that the displacement amount L of the center point P1 of the wafer W to the +X side with respect to the center point P0 of the spin chuck 82 during the thermal expansion described in FIG. 6 is compensated. Then, current to be supplied to the motor 34 is controlled to move the substrate supporter 2 to the transfer position such that the center points P0 and P1 are aligned with each other in a plan view. That is, the compensated number of pulses is calculated according to the displacement amount L, and the current is controlled to compensate for this displacement amount L. Therefore, the number of command pulses for driving the motor 34 is changed to shift the transfer position to the −X side as the thermal expansion of the housing 36 increases. As described above, in this control, compensation of the transfer position is performed before the substrate supporter 2 is moved to the transfer position, as feed forward control.

Although a description will be given later in detail, characteristic data unique to the linear drive mechanism 31 is used in addition to torque, in calculating the compensated number of pulses described above. In addition, torque uses plural pieces of data acquired in one duration and plural pieces of data acquired in another duration following this duration. For the sake of convenience in description, while the outline of control of the motor 34 of the linear drive mechanism 31 has been described, the motor 34 of the linear drive mechanism 61 is also controlled in the same way, and the above-described characteristic data uses pieces of data of the linear drive mechanisms 31 and 61. However, for the sake of avoiding complexity of description, hereinbelow, control of the linear drive mechanism 31 in one transfer mechanism F2 and components for performing such control are described as a representative example.

Figure 8:
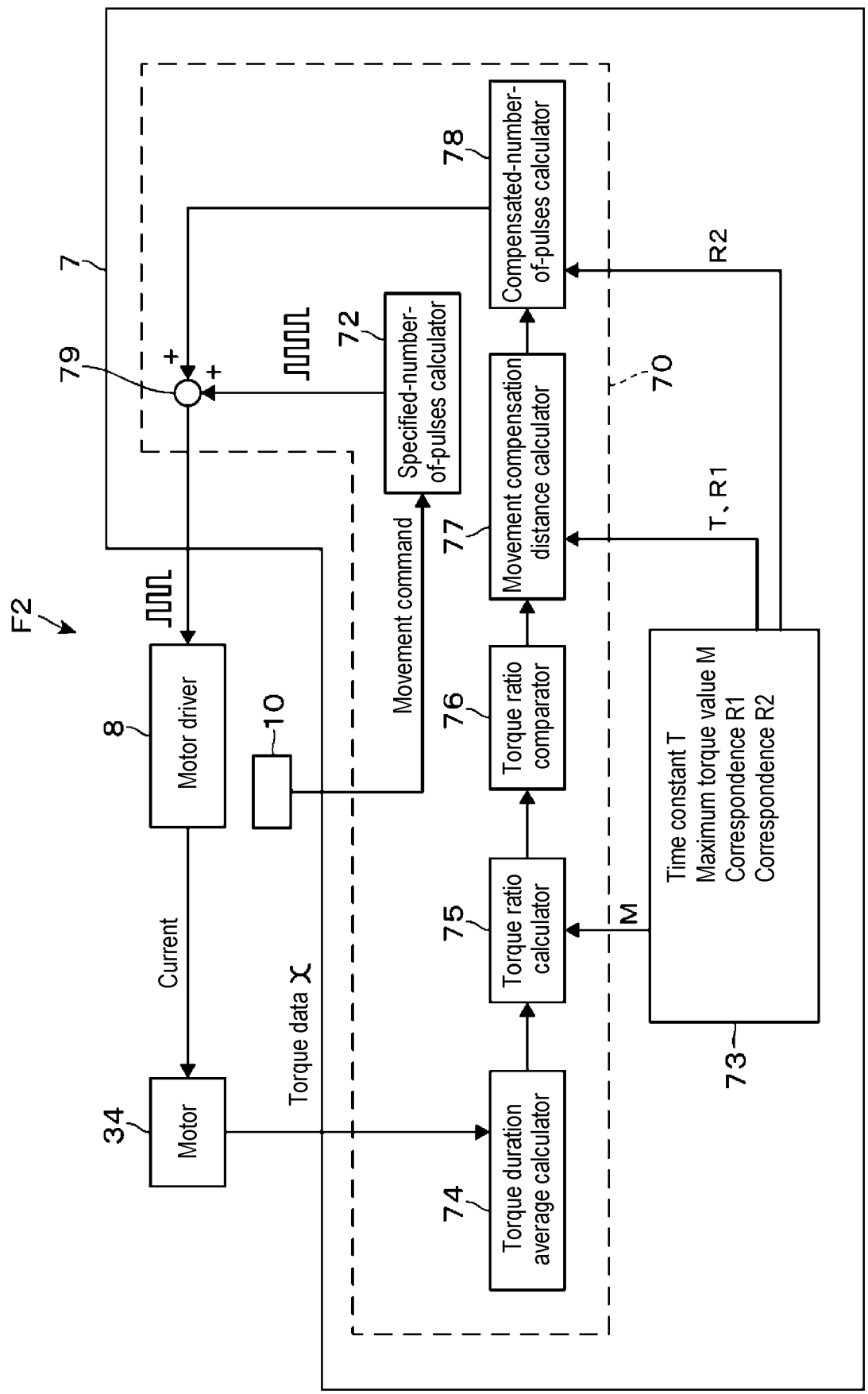
FIG. 8 is a block diagram illustrating the motor control method.

Next, the lower controller 7 provided in the coating/developing apparatus 1 will be described with reference to a block diagram of FIG. 8. Like the upper controller 10, the lower controller 7 is a computer includes a software 70 configured by various programs, a storage 73, and a CPU (not illustrated). The software 70 is stored in a non-transitory computer-readable storing medium like the software of the upper controller 10.

The software 70 is further described. The software 70, as a program, includes a specified-number-of-pulses calculator 72 for calculating the specified number of pulses described in FIGS. 6 and 7 according to the movement command signal transmitted from the upper controller 10, and a calculator 79 for calculating the number of command pulses from the specified number of pulses and the compensated number of pulses. Programs for calculating the compensated number of pulses from torque are included in the software 70. These programs are shown as a torque duration average calculator 74, a torque ratio calculator 75, a torque ratio comparator 76, a movement compensation distance calculator 77, and a compensated-number-of-pulses calculator 78.

The torque duration average calculator 74 constituting a data acquirer acquires pieces of torque data output from the motor 34, for example, every 10 milliseconds, sequentially accumulates the acquired pieces of data, and calculates an accumulated value X in a duration for a certain period of time, for example, 10 seconds, as one duration. Therefore, when the acquired pieces of torque data is sequentially x1, x2, . . . , x10³, the accumulated value X is the sum of pieces of 10³ torque data. Further, a duration average value, $X/10^3$, is calculated by dividing the accumulated value X by $10^3$, which is the number of pieces of torque data acquired in this duration.

The torque ratio calculator 75 calculates, as a percentage, a ratio of the duration average value $X/10^3$ of the acquired pieces of torque to a pre-acquired maximum torque value M of the motor 34. The value of this percentage is hereinafter described as a torque ratio. Therefore, torque ratio=$X/10^3/M \times 100$ (unit: %). This torque ratio is pieces of accumulation correspondence data corresponding to the accumulated value of torque, and the torque duration average calculator 74 and the torque ratio calculator 75 constitute an accumulation correspondence data acquirer.

The torque ratio comparator 76 compares a newly acquired torque ratio with an immediately previous acquired torque ratio. Specifically, since the duration average is obtained by regarding 10 seconds as one duration as described above, the duration average of torque and the torque ratio are acquired every 10 seconds. Therefore, assuming that the most newly acquired torque ratio is $A_n$, $A_n$ is compared with a torque ratio (referred to as $A_{n-1}$) acquired 10 seconds before $A_n$ is acquired.

The movement compensation distance calculator 77 constitutes a displacement amount acquirer for calculating the displacement amount L (unit: mm) described in FIG. 6, based on a comparison result of torque ratios $A_{n-1}$ and $A_n$ obtained by the torque ratio comparator 76, a preset constant (referred to as a time constant T), and a preset correspondence (referred to as a distance acquisition correspondence R1). In addition, as described above, the displacement amount L is a distance that occurs when the number of pulses is output to the motor 34 without compensating for the specified number of pulses. Therefore, calculating this displacement amount L is calculating the compensation amount of the distance of the transfer position of the substrate supporter 2 for aligning the center point P1 of the wafer W with the center point P0 of the spin chuck 82 in a plan view. The above-described time constant T and distance acquisition correspondence R1 will be described later in detail.

The compensated-number-of-pulses calculator 78 calculates the compensated number of pulses, based on a preset correspondence (referred to as a number-of-pulses acquisition correspondence R2), which is a correspondence between the displacement amount L and the compensated number of pulses, and on the displacement amount L acquired by the movement compensation distance calculator 77. The compensated number of pulses is 0 to a minus (−) integer value and an absolute value thereof acquired increases as the displacement amount L calculated increases. As described above, the compensated number of pulses calculated by this compensated-number-of-pulses calculator 78 is updated every 10 seconds, in accordance with the calculation of the duration average value of torque in every duration of 10 seconds. In addition, a series of processes from the acquisition of the torque data to the calculation of the compensated number of pulses is performed even when the transfer mechanism F2 is not operating and is in an idle state.

When the movement command signal is output from the upper controller 10, and the specified number of pulses is calculated by the specified-number-of-pulses calculator 72 in order for the substrate supporter 2 to move from the standby position to the transfer position, the calculator 79 calculates the number of command pulses by adding the compensated number of pulses to the specified number of pulses. As described above, since the compensated number of pulses is calculated, the number of command pulses decreases as the displacement amount L increases. A pulse signal of this number of command pulses is output to the motor driver 8, and current according to the number of command pulses is supplied to the motor 34, so that the substrate supporter 2 moves to the transfer position as described in FIG. 7. While FIG. 7 illustrates a control operation when the substrate supporter 2 transfers the wafer W to the spin chuck 82, the same control operation is performed even when the substrate supporter 2 receives the wafer W from the spin chuck 82. As described above, the lower controller 7 and the motor driver 8 constitute a current supplier that controls the supply of current to the motor 34 based on the pieces of torque data.

The storage 73 stores pieces of data needed to process the above-described software 70. Specifically, the storage 73 stores the maximum torque value M used in the torque ratio calculator 75, the time constant T and the distance acquisition correspondence R1 used in the movement compensation distance calculator 77, and the number-of-pulses acquisition correspondence R2 used in the compensated-number-of-pulses calculator 78. Further, the maximum torque value M and the time constant T are characteristic data unique to the linear drive mechanism 31 described above. In addition, the storage 73 stores the torque ratio calculated in a process of acquiring the compensated number of pulses. As described above, while the torque ratio is acquired in each predetermined duration, since two torque ratios, i.e., the newest pulse torque ratio and the latest torque ratio, are used to calculate the compensated number of pulses, the stored pieces of data is updated so as to maintain only these two torque ratios for example.

The time constant T will be described with reference to a graph of FIG. 9. This time constant T is a pre-acquired constant obtained by conducting a test before the transfer mechanism F2 is driven. In the test, the movement of the substrate supporter 2 is repeatedly performed based on a transfer situation of the wafer W in the apparatus. That is, the substrate supporter 2 is repeatedly moved at the same speed as that of the transfer of the wafer W and with the same frequency as that of the transfer of the wafer W. In the meantime, the torque ratio of the motor 34 that moves the substrate supporter 2 is obtained in every duration, as described above. When an elapsed time from the start of movement is set on a horizontal axis and a torque ratio is set on the vertical axis, the torque ratio changes as represented as a solid line graph in FIG. 9. Specifically, the torque ratio continues to rise as time passes from the state in which the torque ratio is 0%. When the torque ratio reaches 100%, the state of the torque ratio of 100% is maintained. The relationship between the torque ratio and the elapsed time while the torque ratio rises on the graph may be regarded as a linear function.

As described above, since the torque of the motor 34 and the heat generation state of the motor 34 are correlated, and the displacement amount L due to the thermal expansion of the housing 36 is displaced according to the heat generation of the motor, it may be said that a change in the torque ratio represented as this solid line graph corresponds to or substantially corresponds to a change in the displacement amount L. The above time constant T is a constant corresponding to a slope θ of the graph that may be regarded as the linear function in this way. Since the time constant T is a constant, the time constant T represents with how much latency the torque ratio reaches 100% after the driving of the motor 34 starts. In addition, when the operation of the motor 34 is stopped to dissipate heat and the motor 34 is cooled, the torque ratio decreases over time as opposed to the case in which the motor 34 continues to operate, according to a portion that may be regarded as the linear function of the graph.

However, as described above, the transfer mechanism F2 includes a plurality of linear drive mechanisms. In addition, each linear drive mechanism includes constituent members other than the motor 34. During the operation of the transfer mechanism F2, even the constituent members other than the motor 34 generate heat although heat generated by the constituent members is less than heat generated by the motor 34. Further, the linear drive mechanisms 31 and 61 are different in arrangement intervals of constituent members other than the motor 34, sizes of the constituent members, sizes of spaces in the housing accommodating the linear drive mechanism 31 or 51, and the like. Since environments around the motor 34 are different in this way, even when the linear drive mechanisms 31 and 51 have the same motor 34, the state of retention of heat around each motor 34 is different.

Figure 9:
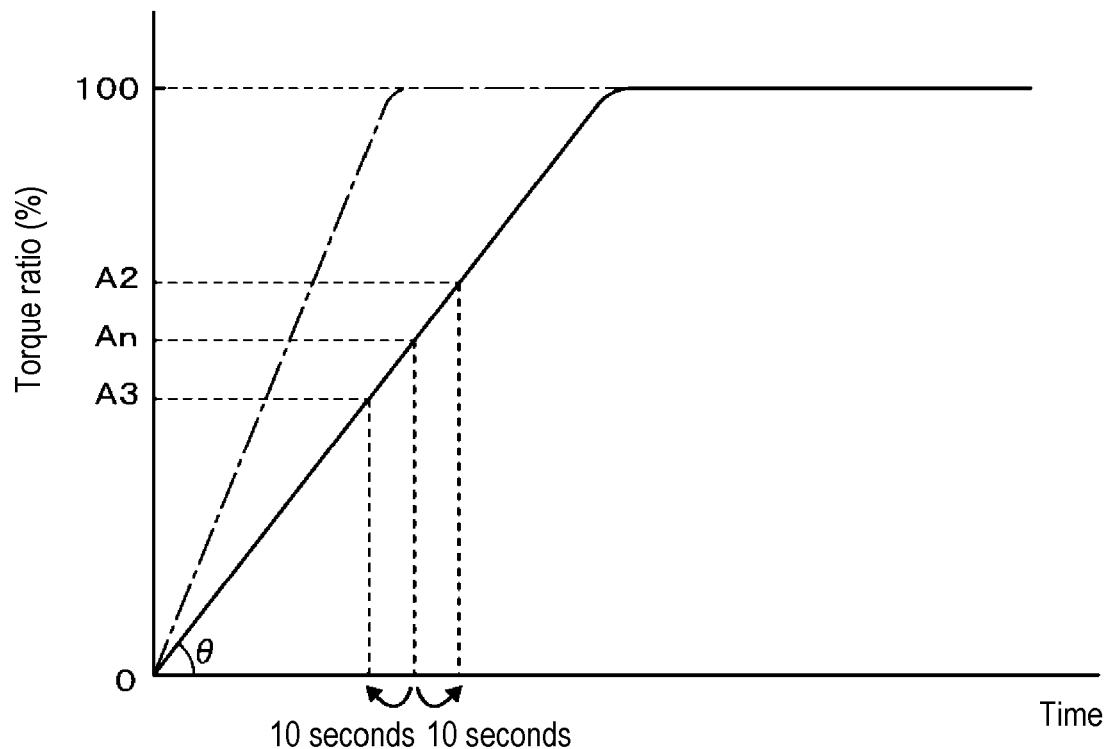
FIG. 9 is a graph illustrating a torque ratio of a motor as a function of time.

In acquiring the time constant T of the motor 34 in the linear drive mechanism 61, a graph obtained by conducting the same test as a test for acquiring the time constant T of the motor 34 in the linear drive mechanism 31 is illustrated in FIG. 9 as a dashed line. In the dashed line graph, while the torque ratio rises so as to regard the torque ratio as the linear function like the solid line graph of the motor 34 of the linear drive mechanism 31, a slope of the dashed line graph is different from a slope of the solid line graph due to an environmental difference. Therefore, the time constant T of the motor 34 of the linear drive mechanism 31 is set to a constant unique to the motor 34. In addition, although the slope of the dashed line graph illustrated in FIG. 9 is larger than the slope of the solid line graph, the slope of the dashed line graph is not limited to such a large slope.

Meanwhile, the distance acquisition correspondence R1 as data other than the time constant T used in the above-mentioned movement compensation distance calculator 77 is stored in the storage 73 of the lower controller 7. The movement compensation distance calculator 77 calculates an expected torque ratio A (unit: %) obtained by compensating for the torque ratio $A_n$, from a predetermined calculation algorithm using the torque ratios $A_{n-1}$ and $A_n$ and the time constant T, as a previous operation of calculating the displacement amount L. A correspondence between this expected torque ratio and the displacement amount L is the distance acquisition correspondence R1. The movement compensation distance calculator 77 also calculates the displacement amount L from the distance acquisition correspondence R1 and from the calculated expected torque ratio.

Here, the time constant T is described. As described so far, when the torque of the motor 34 (and the torque ratio calculated from the torque) increases, the amount of thermal expansion of the housing 36 of the base 3 also increases. However, the torque ratio is obtained in every duration of a certain length. It may be considered that a torque ratio calculated in a specific duration is greatly different a torque ratio in another duration, depending on a driving situation of the transfer mechanism F2. Specifically, for example, it may be considered that the torque ratio is calculated as 0% when the operation of the transfer mechanism F2 is temporarily stopped in a specific duration even when the transfer mechanism F2 is in operation in another duration.

However, heat around the motor 34 and the amount of thermal expansion of the housing 36 fluctuate gently regardless of such a temporary sudden change of the torque ratio. In other words, even when the torque and the torque ratio substantially correspond to the amount of thermal expansion of the housing 36, this correspondence may not be matched in an actual operation situation of the transfer mechanism F2. Therefore, when the displacement amount L and the compensated number of pulses are calculated based only on the torque ratio for example, the displacement between the center point P1 of the wafer W and the center point P0 of the spin chuck 82 may not be sufficiently canceled.

Therefore, the calculation algorithm executed by the movement compensation distance calculator 77 uses the time constant T as well in addition to the torque ratio. By using the time constant T in this way, since the compensated number of pulses may be calculated based on a torque ratio varying with time as illustrated as the solid line graph in FIG. 9, the influence of the torque ratio may be suppressed and the displacement between the center points P0 and P1 may be canceled with high precision, even when the torque ratio is abruptly changed. In this way, since the compensated number of pulses is originally calculated under the expectation that the torque ratio will change as illustrated in the graph of FIG. 9, the time constant T defining the graph of FIG. 9 may be information about expectation of a change in the torque ratio.

Figure 10:
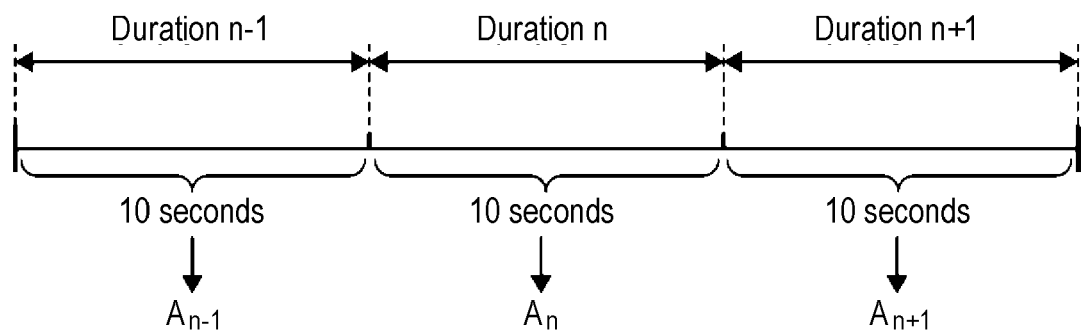
FIG. 10 is a time chart illustrating a correspondence between the torque ratio and a duration.

Calculation by the movement compensation distance calculator 77 and the torque ratio comparator 76 located prior thereto will be described by way of a specific example. The following description of calculation is an example for facilitating understanding of the gist of calculation of the compensated number of pulses based on torque ratios of two durations and on the time constant T, and the calculation method is not limited to the description. In the description, reference is also appropriately made to FIG. 10 illustrating a time chart. As illustrated in FIG. 10, durations in which torque ratios $A_n$ and $A_{n-1}$ are acquired are defined as a duration n and a duration n−1, respectively. The torque ratio comparator 76 calculates a difference value $A_n - A_{n-1}$ of the torque ratios as a comparison between the torque ratios $A_n$ and $A_{n-1}$ and determines whether this difference value is a positive value or a negative value.

When the difference value is a positive value, this means that heat has been stored. A torque ratio displaced on the side on which torque rises in 10 seconds, which is one duration, is calculated from the torque ratio $A_n$ based on the time constant T. In the example illustrated in FIG. 9, the torque ratio is A2, and the compensated number of pulses is calculated using this torque ratio A2 as the expected torque ratio A2. In the subsequent calculation, $A_n$ is treated as A2 ($A_n$=A2).

When the difference value is a negative value, this means that heat has been dissipated. A torque ratio displaced on the side in which the torque decreases in 10 seconds, which is one duration, is calculated from the torque ratio $A_n$ based on the time constant T. In the example illustrated in FIG. 9, the torque ratio is A3, and the compensated number of pulses is calculated using this torque ratio A3 as the expected torque ratio A3. In the subsequent calculation, $A_n$ is treated as A3 ($A_n$=A3).

In this way, whether heat has been stored or dissipated is detected from the torque ratio $A_{n-1}$ calculated in a duration n−1, which is a first duration, and from the torque ratio $A_n$ calculated in a duration n, which is a second duration after the first duration. $A_n$ expected torque ratio serving as a source of calculation of the compensated number of pulses is determined from the detection result and the time constant T representing the displacement of the torque ratios. Further, a torque ratio calculated from the next duration n+1 of the duration n is referred to as $A_{n+1}$. When the torque ratio $A_{n+1}$ is thus output, the torque ratio comparator 76 and the movement compensation distance calculator 77 calculate the compensated number of pulses by performing the same calculations as that described above. That is, the torque ratio $A_{n+1}$ instead of the torque ratio $A_n$ and $A_n$ instead of $A_{n-1}$ are used in the above description of calculation, so that the compensated number of pulses is calculated again. In addition, $A_n$ in the calculation performed again in this way is A2 or A3.

While the control of the motor 34 in the linear drive mechanism 31 of the base 3 has been explained so far, the motor 34 in the linear drive mechanism 61 of the left-right driving block 6 is identically controlled. The constant T in this control uses a value unique to the linear drive mechanism 61 corresponding to the slope of a portion serving as the linear function of the dashed line graph illustrated in FIG. 9. By this control, displacement of the Y direction relative to the target transfer position of the wafer W, due to the expansion of the housing 66 of the linear drive mechanism 61 in the left-right direction (Y direction) by thermal expansion, is suppressed.

From the above description, the transfer of the wafer W to the spin chuck 82 of the resist film forming module 14 suppresses the displacement between the center point P1 of the wafer W and the center point P0 of the spin chuck 82 in a plan view in each of the X direction and the Y direction. When the substrate supporter 2 among the modules to which the wafer W is transferred by the transfer mechanism F2 other than the resist film forming module 14 moves, orthogonality between the movement direction (X direction) of the substrate supporter 2 and the Y direction suppresses displacement of the X direction and the Y direction in the same way as in the resist film forming module 14. During movement of the substrate supporter 2, when the movement direction (X direction) of the substrate supporter 2 and the Y direction are aligned with each other, displacement of the Y direction (which may be the X direction as well) is suppressed. In this way, the transfer mechanism F2 may transfer the wafer W with high precision to a predetermined target transfer position in each module. In addition, even while the operation of the transfer mechanism F2 is idle, torque data is continuously acquired, and the compensated number of pulses is updated based on the time constant T. Therefore, the wafer W may be transferred with high precision to the predetermined target transfer position in each module even immediately after the operation of the transfer mechanism is resumed.

Meanwhile, the transfer mechanism F1 of the carrier block D1 and the transfer mechanism F6 of the interface block D3 have the same configuration as the transfer mechanism F2 except that the orientation of the left-right driving block 6 of each of the transfer mechanism F1 and the transfer mechanism F6 is different from the orientation of the left-right driving block 6 of the transfer mechanism F2. That is, in these transfer mechanisms F1 and F6, the base 3 linearly moves in directions other than the Y direction. Further, the transfer mechanisms F3 to F5 have the same configuration as the transfer mechanism F2 except that the transfer mechanisms F3 to F5 are not provided with the left-right driving block 6. The transfer operation of the transfer mechanisms F1, F3 to F5 is controlled in the same manner as in the transfer mechanism F2. Therefore, the wafer W may be transferred with high precision not only to the target transfer position of the modules, but also to the target transfer position of the carrier C or the exposure device D4.

For the above-described reason, even linear drive mechanisms disposed in the same places between the transfer mechanisms F1 to F6 are controlled using unique time constants as the time constant T. Specifically, while the bases 3 are provided in the transfer mechanisms F1 to F6, respectively, it is desirable to prepare unique time constants T for the linear drive mechanisms 31 of the bases 3. In addition, while the transfer mechanisms F2 are provided in the unit blocks H1 to H6, respectively, as illustrated in FIG. 2, the linear drive mechanisms arranged in the same places in the transfer mechanisms F2 are desirably controlled by unique time constants. That is, it is desirable that the linear drive mechanisms 31 of the bases 3 of the transfer mechanisms F1 to F6 be controlled by respective unique time constants T.

In addition, a description has been given of controlling the position of the wafer W in the X direction, which is a transverse direction, and the Y direction so as to appropriately process the wafer W. Control is not limited thereto, and the motor 34 of the linear drive mechanism 51 that raises and lowers the base 3 may be controlled in the same manner as the motors 34 of the linear drive mechanisms 31 and 61. Therefore, the height of the wafer W during the delivery of the wafer W to a module may be suppressed from being displaced from a preset height position. By controlling the height in this way, interference between members constituting the module, the wafer W, and the substrate supporter 2 supporting the wafer W may be suppressed.

Further, each transfer mechanism may be configured such that a through-hole is provided in a wall portion of the housing and the motor 34 protrudes outward of the housing via the through-hole. That is, the motor 34 is not limited to a configuration enclosed by the housing of the transfer mechanism. However, in the configuration in which the motor 34 is enclosed by the housing, thermal expansion of the housing tends to easily occur. Accordingly, it is more effective to apply the present technology to a transfer mechanism having a configuration in which the motor 34 is housed inside the housing without being exposed to the outside of the housing.

The length of a duration for acquiring the torque ratio and an interval for acquiring torque data in this duration are not limited to the above example and may be arbitrarily set. Further, while the example of calculating the compensated number of pulses from the torque ratios of two consecutive durations has been explained, the compensated number of pulses may be calculated from torque ratios of two durations separated from each other. Specifically, when the torque ratio $A_{n+1}$ is obtained in a duration n+1 illustrated in FIG. 10, the calculation algorithm for calculating the compensated number of pulses may be performed using $A_{n+1}$ and $A_{n-1}$ as the torque ratios. That is, the compensated number of pulses may be calculated using $A_{n+1}$ instead of the torque ratio $A_n$ in the example described above.

In addition, while a constant corresponding to the slope θ is set to the time constant T because the torque ratio rises so that the torque ratio may be regarded as a linear function as described in FIG. 9, it may be assumed that the torque ratio rises, for example, in a curve shape rather than linearly, by the influence of external disturbance. In that case, the storage 73 may store a higher-order function expression corresponding to the curve instead of the constant. That is, it is assumed that the torque ratio changes as represented by the higher-order function expression, and the arithmetic algorithm for calculating the expected torque ratio A and the compensated number of compensation may be set based on the higher-order function expression and the torque ratios of two durations. Therefore, information indicating the change of the torque ratio is not limited to the constant.

Here, it is advantageous that the constant rather than such a function be stored in the storage 73 of the lower controller 7 in order to indicate the change in the torque ratio because the amount of pieces of data to be stored in the storage 73 is reduced. In addition, for the calculation of the compensated number of pulses described above, an algorithm designed to use the torque ratios of only two durations among torque ratios acquired for respective durations is advantageous from the viewpoint of reducing a capacity of the storage 73.

In addition, while torque data acquired in one duration is accumulated, and a duration average of the accumulated value and a torque ratio from the duration average are calculated, processing of data is not limited thereto. For example, the duration average of torque may be obtained without calculating the torque ratio. Correspondingly, the duration average of torque instead of the torque ratio is set on the vertical axis of the graph of FIG. 9, and then a value corresponding to the slope θ of a graph acquired by conducting a test is set to the time constant T. Further, the same calculation as in the case of using the torque ratio is performed using the duration average of torque in the two durations instead of the torque ratios of the two durations. Regarding the correspondence R1 used thereafter, a correspondence between the duration average of torque and the displacement amount L, instead of a correspondence between the torque ratio and the displacement amount L, is specified to calculate the compensated number of pulses.

In this way, the pieces of accumulation correspondence data of torque used to calculate the compensated number of pulses may be data obtained by processing the accumulated value of torque and is not limited to the torque ratio. In addition, the compensated number of pulses may be calculated from the accumulated value itself of torque and the time constant T without calculating the duration average of torque. The time constant T may be acquired through a test conducted by setting the accumulated value of torque instead of the torque ratio on the vertical axis of the graph of FIG. 9. Therefore, the pieces of accumulation correspondence data of torque also includes the accumulated value itself of torque.

However, each motor 34 differs in the magnitude of the duration average of torque or the accumulated value of torque. By calculating the torque ratio, subsequent calculation until the compensated number of pulses is obtained is common among the motors 34 except that the time constant T is different. That is, from the viewpoint of reducing labor required to create a program for acquiring the compensated number of pulses for each of the motors 34, it is desirable to calculate the duration average of torque and use the duration average in the subsequent calculation.

Meanwhile, the torque ratio obtained as described above substantially corresponds to the displacement amount L. Therefore, when the torque ratio of one duration is obtained, the compensated number of pulses may be calculated by calculating the displacement amount L from the torque ratio, and a correspondence between a prepared torque ratio and the displacement amount L. That is, the calculation of the compensated number of pulses is not limited to using the time constant T. However, as described above, the time constant T is desirably used in order to increase the transfer precision of the wafer W.

Although the motor control method of the present disclosure is used for the drive mechanism of the substrate transfer mechanism, the motor control method is not limited thereto and may be used for the movement mechanism of the processing module such as the resist film forming module 14 illustrated in FIG. 1, for example. Specifically, the motor 88 included in the resist film forming module 14 constitutes a portion of the same linear drive mechanism as the linear drive mechanism 61, and the respective linear drive mechanism is configured to move the resist nozzle 87 in the Y direction through the mover 85. Further, the operation of the motor 88 is controlled in the same manner as the operation of the motor 34 of the transfer mechanism F2, so that a resist may be supplied to the center point P1 of the wafer W with high precision. Therefore, in this case, the resist nozzle 87 is an object to be transferred. In this way, the object to be transferred is not limited to the substrate. Further, the substrate to be transferred is not limited to the wafer W and may be a rectangular substrate such as a substrate for manufacturing a flat panel display (FPD).

Substrate processing performed in the apparatus to which the transfer mechanism of the present disclosure is applied is not limited to the exemplified resist film formation, heating, exposure, and development. For example, the substrate processing includes forming a coating film other than the resist film, such as an insulating film or an antireflection film, cleaning by supply of cleaning liquid, capturing a substrate for performing inspection by images, and coating an adhesive material for bonding substrates to each other.

According to the present disclosure in some embodiments, it is possible to transfer an object to be transferred to a target transfer position in the substrate processing apparatus.

It should be noted that the embodiments disclosed herein are exemplary in all respects and are not restrictive. The above-described embodiments may be omitted, replaced, modified or combined in various forms without departing from the scope and spirit of the appended claims.

What is claimed is:

1. A motor control method for transferring an object to be transferred by a moving object that moves by driving of a motor in a substrate processing apparatus, the motor control method comprising:
a data acquisition process of acquiring, at different times, pieces of drive data which relate to the driving of the motor and vary with heat generation of the motor; and
a transfer process of transferring the object to be transferred by controlling current to be supplied to the motor, based on each of the pieces of drive data, to compensate for displacement of the object to be transferred from a target transfer position due to the heat generation of the motor,
wherein the data acquisition process is a process of acquiring the pieces of drive data multiple times in each of a first duration and a second duration after the first duration, and includes a process of acquiring pieces of accumulation correspondence data that correspond to an accumulated value obtained by accumulating the pieces of drive data in each of the first duration and the second duration, and
wherein the transfer process includes a process of controlling the current to be supplied to the motor based on each of the pieces of accumulation correspondence data.

2. The motor control method of claim 1, wherein the transfer process includes a process of controlling the current to be supplied to the motor based on information about expectation of a change in the pieces of accumulation correspondence data and on the pieces of accumulation correspondence data in each of the first duration and the second duration.

3. The motor control method of claim 2, wherein the pieces of drive data are pieces of torque data of the motor.

4. The motor control method of claim 3, wherein the object to be transferred is a substrate,
wherein the moving object is a substrate supporter configured to support the substrate, and
wherein the transfer process includes a process of moving the substrate toward a stage provided to place the substrate on the stage in the substrate processing apparatus.

5. The motor control method of claim 4, wherein the motor is enclosed by a housing and the substrate supporter moves toward the housing, and
wherein the compensation for displacement is performed to compensate for displacement caused by thermal expansion of the housing.

6. The motor control method of claim 5, wherein the transfer process is a process of transferring the substrate in a transverse direction along a straight line toward the target transfer position above the stage, and
wherein the displacement occurs in the transverse direction.

7. A non-transitory computer-readable storing medium that records software used in a substrate processing apparatus and incorporating a group of steps for executing the motor control method of claim 1.

8. A motor control method for transferring an object to be transferred by a moving object that moves by driving of a motor in a substrate processing apparatus, the motor control method comprising:
a data acquisition process of acquiring, at different times, pieces of drive data which relate to the driving of the motor and vary with heat generation of the motor; and
a transfer process of transferring the object to be transferred by controlling current to be supplied to the motor, based on each of the pieces of drive data, to compensate for displacement of the object to be transferred from a target transfer position due to the heat generation of the motor, wherein the data acquisition process comprises:
a process of acquiring pieces of accumulation correspondence data corresponding to an accumulated value of the pieces of drive data; and
a process of acquiring an amount of the displacement based on the pieces of accumulation correspondence data, and
wherein the transfer process includes a process of controlling the current to be supplied to the motor based on the acquired amount of the displacement.

9. The motor control method of claim 8, wherein the pieces of drive data are pieces of torque data of the motor.

10. The motor control method of claim 9, wherein the object to be transferred is a substrate,
wherein the moving object is a substrate supporter configured to support the substrate, and
wherein the transfer process includes a process of moving the substrate toward a stage provided to place the substrate on the stage in the substrate processing apparatus.

11. The motor control method of claim 10, wherein the motor is enclosed by a housing and the substrate supporter moves toward the housing, and
wherein the compensation for displacement is performed to compensate for displacement caused by thermal expansion of the housing.

12. The motor control method of claim 11, wherein the transfer process is a process of transferring the substrate in a transverse direction along a straight line toward the target transfer position above the stage, and
wherein the displacement occurs in the transverse direction.

13. A transfer device including a transfer mechanism used in a substrate processing apparatus and configured to transfer an object to be transferred by driving of a motor, the transfer device comprising:
a data acquirer configured to acquire, at different times, pieces of drive data which relate to the driving of the motor and vary with heat generation of the motor;
a current supplier configured to control current to be supplied to the motor, based on each of the pieces of drive data, to compensate for displacement of the object to be transferred from a target transfer position due to the heat generation of the motor; and
a moving object configured to move with the driving of the motor so as to transfer the object to be transferred,
wherein the data acquirer acquires the pieces of drive data multiple times in each of a first duration and a second duration after the first duration, and includes an accumulation correspondence data acquirer configured to acquire pieces of accumulation correspondence data that correspond to an accumulated value obtained by accumulating the pieces of drive data in each of the first duration and the second duration, and
wherein the current supplier controls the current to be supplied to the motor based on each of the pieces of accumulation correspondence data.

14. The transfer device of claim 13, wherein the current supplier controls the current to be supplied to the motor based on information about expectation of a change in the pieces of accumulation correspondence data and on the pieces of accumulation correspondence data in each of the first duration and the second duration.

15. The transfer device of claim 14, wherein the pieces of drive data is pieces of torque data of the motor.

16. The transfer device of claim 15, wherein the object to be transferred is a substrate,
wherein the moving object is a substrate supporter configured to support the substrate, and
wherein the substrate is moved toward a stage provided to place the substrate on the stage in the substrate processing apparatus.

17. The transfer device of claim 16, further comprising a housing configured to enclose the motor,
wherein the substrate supporter moves to the housing, and
wherein the compensation for displacement is performed to compensate for displacement caused by thermal expansion of the housing.

18. The transfer device of claim 17, wherein the substrate supporter transfers the substrate in a transverse direction along a straight line toward the target transfer position above the stage, and
wherein the displacement occurs in the transverse direction.

19. A transfer device including a transfer mechanism used in a substrate processing apparatus and configured to transfer an object to be transferred by driving of a motor, the transfer device comprising:
a data acquirer configured to acquire, at different times, pieces of drive data which relate to the driving of the motor and vary with heat generation of the motor;
a current supplier configured to control current to be supplied to the motor, based on each of the pieces of drive data, to compensate for displacement of the object to be transferred from a target transfer position due to the heat generation of the motor;
a moving object configured to move with the driving of the motor so as to transfer the object to be transferred; and
a displacement amount acquirer configured to acquire an amount of the displacement based on pieces of accumulation correspondence data corresponding to an accumulated value of the pieces of drive data acquired by the data acquirer,
wherein the current supplier controls the current to be supplied to the motor based on the acquired amount of the displacement.

20. The transfer device of claim 19, wherein the pieces of drive data is pieces of torque data of the motor.

21. The transfer device of claim 20, wherein the object to be transferred is a substrate,
wherein the moving object is a substrate supporter configured to support the substrate, and
wherein the substrate is moved toward a stage provided to place the substrate on the stage in the substrate processing apparatus.

22. The transfer device of claim 21, further comprising a housing configured to enclose the motor,
wherein the substrate supporter moves to the housing, and
wherein the compensation for displacement is performed to compensate for displacement caused by thermal expansion of the housing.

23. The transfer device of claim 22, wherein the substrate supporter transfers the substrate in a transverse direction along a straight line toward the target transfer position above the stage, and
wherein the displacement occurs in the transverse direction.

* * * * *